United States Patent Office 3,213,020
Patented Oct. 19, 1965

3,213,020
LUBRICANTS CONTAINING METAL PHOSPHINO-
THIOATE-EPOXIDE REACTION PRODUCTS
Thomas Robert Hopkins, Merriam, Kans., and Arthur N.
Arakelian, Cleveland, and Alan Rhodes, Willoughby,
Ohio, assignors to The Lubrizol Corporation, Wickliffe,
Ohio, a corporation of Ohio
No Drawing. Filed Mar. 11, 1963, Ser. No. 264,028
5 Claims. (Cl. 252—32.7)

This invention relates as indicated to certain phosphorus thioic acid derivatives and to a process for the preparation thereof. In a more particular consideration, the invention relates to reaction products obtained from metal salts of organic phosphorus thioic acids. This application is a continuation-in-part of copending application Ser. No. 484,556, filed January 27, 1955 and now abandoned.

The products of the hereindescribed process are useful as additives for lubricants, especially for gear lubricants.

It is a principal object of the present invention to provide new compositions of matter.

It is also an object of the present invention to provide a novel process for the preparation of the above compositions of matter.

It is still a further object of the invention to provide novel additives for lubricants.

These and other objects are accomplished by a process which comprises the reaction of a metal salt of a phosphorus thioic acid having the structure

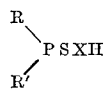

where R and R' are the same or different hydrocarbon radicals having from one to about 30 carbon atoms, and X is oxygen or sulfur, with at least about 0.5 equivalent of an organic epoxide or thioepoxide.

The hydrocarbon radicals in the above structure are preferably non-functional, which is to say that they do not take part in or have any significant influence upon the reaction of the process. R and R' may be aliphatic, cycloaliphatic, or aromatic, and may contain organic or inorganic substituents. Illustrative types of the radicals include alkyl, cycloalkyl, aryl, aralkyl, alkaryl, alkenyl, cycloalkenyl, etc., and the substituted derivatives of these; e.g. nitro-, halo-, alkoxy-, hydroxy-, carboxy-, etc. Thus suitable organic radicals would include; e.g., methyl, ethyl, n-propyl, isopropyl, n-butyl, isobutyl, amyl, isoamyl, n-hexyl, 4-methyl-2-pentyl, cyclohexyl chloro-cyclohexyl, methyl-cyclohexyl, heptyl, n-octyl, tert-octyl, nonyl lauryl, cetyl, phenyl, bromophenyl, nitro-phenyl, methoxy-phenyl, ethyl-phenyl, propyl-phenyl, butyl-phenyl, amyl-phenyl, benzyl, phenethyl, allyl, octenyl, cyclohexenyl, etc.

The above illustrated structures, it will be seen, include the phosphinomonothioic acids and phosphinodithioic acids, and the metal salts of the latter acids comprise the preferred starting materials of the hereindescribed process.

The phosphinodithioic acids may be prepared most conveniently by the process described in U.S. Patent No. 2,797,238. This process comprises the reaction of an aromatic compound with phosphorus pentasulfide in the presence of an aluminum halide. Other means of preparing phosphinodithioic acids involve either the reaction of a Grignard reagent with phosphorus pentasulfide or sulfurization of a secondary phosphine. The phosphinomonothioic acids may be prepared by the partial hydrolysis of the phosphinodithioic acids with water or steam under conditions such that only one sulfur radical is replaced with a hydroxy radical. They likewise are known in the art and need not be described in detail here.

Metal salts of the above phosphinothioic acids may be prepared quite conveniently by treating the particular acid with a metal oxide or hydroxide. Thus, the calcium salt of a phosphinodithioic acid may be prepared from the acid by reaction with calcium oxide.

The organic epoxides and thioepoxides may be represented as having the structural grouping

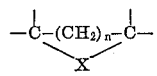

where X is oxygen or sulfur and $n$ is 0 or 1. Those epoxides and thioepoxides are preferred in which one of the carbon atoms attached to X is attached also to two hydrogen atoms. In other words, the preferred compounds are terminal epoxides and thioepoxides and have the structural grouping

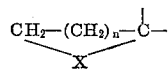

where $n$ is 0 or 1. These have been given the name terminal epoxides and thioepoxides because they may be thought of as being derived in most instances from a vinyl compound or one which has a terminal olefinic double bond.

Specific examples of suitable epoxides include ethylene oxide, propylene oxide, epichlorohydrin, 1-butene oxide, butadiene monoxide, 1-amylene oxide, styrene oxide, trimethylene oxide, 9,10-epoxystearic acid, etc.

As noted previously, the process of the invention contemplates the use either of epoxides or thioepoxides. As a matter of convenience, the term epoxide is used hereinafter in a broad sense to indicate both the epoxides and thioepoxides.

The reaction of organic epoxides with metal salts of phosphinothioic acids is in some cases an exothermic reaction which may be carried out conveniently within the temperature range of 0–200° C. In those cases in which the reaction is exothermic, the exothermic nature of the reaction usually is such that the temperature of the reaction can be controlled within this range without the application of any external heating, by adding the organic epoxide portionwise to the salt of the phosphinothioic acid. Although it is not necessary, it is preferred to control the temperature so that it is reasonably constant throughout the course of the reaction. It is particularly preferred to control the temperature within the range of 50–100° C.

The reaction may be carried out in the presence or absence of a mutual solvent for the organic epoxide and the metal salt of the phosphinothioic acid. If a solvent is used, it should be one which is inert towards both reactants such as, e.g., petroleum ether, kerosene, light and heavy mineral oils, benzene, toluene, xylene, ortho-dichlorobenzene, carbon tetrachloride, etc. Since metal salts of phosphinothioic acids are often prepared as solutions in such inert solvents, these solutions may be conveniently used for reaction with the organic epoxide.

Neither the mechanism by which the reaction proceeds nor the identity of the products which are formed thereby are known or understood. It appears that the reaction involves the addition of the epoxide to the phosphinothioic acid salt rather than a condensation of the two reactants. It appears also that the preferred reaction involves equivalent amounts of the salt and epoxide, e.g., one equivalent of the metal salt of a phosphinothioic acid reacts with one equivalent amount of a terminal organic epoxide. Something more than a mere addition reaction must take place, however, since it appears that the product is not a metal salt. This is borne out by a comparison of some of its reactions with similar reactions of the corresponding metal phosphinothioate from which it is prepared. Thus the organic portion of the metal salt which is the starting material is not affected by treatment with alcoholic hydrochloric acid, whereas in the case of its epoxide reaction product the organic portion thereof is rather completely decomposed by such treatment. In this case it is evident that some molecular rearrangement is involved in addition to the addition of the two specified reactants. In any case, the exact molecular structure of the product is not known and for this reason the product must be described in terms of the process by which it may be prepared.

The desired products are formed by the reaction of one equivalent of the metal salt with as little as 0.5 equivalent of the epoxide. In some instances, especially where the metal salt is a zinc salt, more than one equivalent of the epoxide may be incorporated in the metal salt. Although the upper limit of the amount of the epoxide capable of reacting with the metal salt is not known, as many as three equivalents of the epoxide may be incorporated into the product. In any event, the use of an excess amount of the epoxide has no adverse effect on the products formed and such use, therefore, is contemplated in this invention. Preferably, from about 0.5 to 1 equivalent of the epoxide is used per equivalent of the metal salt. It will be noted that the equivalent weight of the epoxide is based on the number of the epoxide or thioepoxide radicals in a molecule and the equivalent weight of the metal phosphinothioate is based on the number of the phosphinothioic acid radicals in a molecule. For instance, the equivalent weight of propylene oxide is its molecular weight; that of a sodium phosphinothioate is its molecular weight; and that of a zinc phosphinothioate is one-half its molecular weight.

A wide variety of metal salts may be used, including both monovalent and polyvalent metal salts. The metal salts include the following: sodium, lithium, potassium, calcium, barium, strontium, magnesium, aluminum, lead, cadmium, zinc, etc. The polyvalent metal salts are preferred because of the greater stability of the products obtained therefrom; and the salts of zinc and lead are especially preferred.

It should be noted that the product of the reaction of the hereindescribed process is characterized by retention of the metal in its composition. Thus, for example, the reaction product of a zinc salt of a phosphinodithioic acid and propylene oxide is characterized by the fact that it contains zinc. The zinc (or other metal, as the particular case may be) is present in the product in a relatively stable form; it cannot be washed out by aqueous washings.

Other details of the process of invention are illustrated by the following examples.

EXAMPLE 1

To 686 grams (1 equivalent) of a 37.8% toluene solution of zinc di(isopropylphenyl)phosphinodithioate there is added at 26°–64° C. throughout a period of 20 minutes, 29 grams (0.5 equivalent) of propylene oxide. An exothermic reaction occurs. The mixture is maintained at 35°–64° C. for 2.5 hours and then at 20° C./16 mm. The residue is filtered. The filtrate is a 36.3% toluene solution of the desired product and has a zinc content of 4.75%, a phosphorus content of 4.63%, and a sulfur content of 8.9%.

EXAMPLE 2

A mixture of 440 grams (1.26 equivalents) of di-(propylphenyl) phosphinodithioic acid and 500 grams of hydrogenated terphenyl (as an inert solvent) is heated with stirring to 95° C., and treated first with 10 grams of water and then with 52 grams (0.63 mole) of zinc oxide. The zinc oxide is added portionwise over a period of 20 minutes, and the temperature is maintained at 85°–90° C. for an additional hour. The solvent then is removed by distillation at reduced pressure leaving as a residue the zinc salt of the above acid. To this salt there is added with stirring at 67°–73° C., 81 grams (1.39 equivalents) of propylene oxide; the addition is made over a period of 35 minutes. The resulting mixture is heated at 68–100° C. for 30 minutes and then filtered. The filtrate is a yellowish-brown liquid having the following analyses: percent phosphorus, 3.7; percent sulfur, 5.4; and percent zinc, 2.9.

EXAMPLE 3

The procedure of Example 1 is repeated except that the zinc salt of di(isopropylphenyl)phosphinodithioic acid is replaced on a chemical equivalent basis with zinc salt of diheptylphenyl phosphinodithioic acid.

EXAMPLE 4

A product is obtained by the procedure of Example 1 except that the zinc di(isopropylphenyl)phosphinodithioate is replaced with zinc di(dodecylphenyl)phosphinodithioate and that 1.2 equivalents of propylene oxide is used per equivalent of the zinc salt used.

EXAMPLE 5

The procedure of Example 1 is repeated except that the propylene oxide is replaced on a chemical equivalent basis with propylene sulfide.

EXAMPLE 6

A product is obtained by the reaction at 50°–80° C. of 1 equivalent of zinc di(decylphenyl)phosphinomonothioate with 1.2 equivalents of epichlorohydrin.

EXAMPLE 7

A product is obtained by the reaction at 80°–100° C. of 1 equivalent of zinc dicyclohexylphosphinodithioate with 1 equivalent of propylene oxide.

EXAMPLE 8

A product is prepared by the reaction at 25°–60° C. of zinc dioctylphosphinodithioate with 0.6 equivalent of 2,3-butene oxide.

EXAMPLE 9

A product is obtained by the reaction at 60°–120° C. of 1 equivalent of di(isopropylphenyl)phosphinomonothioate with 1 equivalent of styrene oxide.

EXAMPLE 10

Aproduct is obtained by the reaction at 70°–80° C. of 1 equivalent of di(ethyl naphthyl)phosphinodithioate with 2 equivalents of 1,2-pentene oxide.

EXAMPLE 11

A product is obtained by the reaction at 40°–70° C. of 1 equivalent of lead di(isopropylphenyl)phosphinodithioate with 1 equivalent of propylene oxide.

EXAMPLE 12

A product is obtained by the reaction at 50°–80° C. of 1 equivalent of cuprous diheptylphosphinodithioate with 0.5 equivalent of ethylene oxide.

EXAMPLE 13

A product is obtained by the reaction at 90°–120° C. of 1 equivalent of sodium di(isopropylphenyl)phosphinodithioate with 0.5 equivalent of propylene oxide.

EXAMPLE 14

The procedure of Example 1 is repeated except that 3 equivalents, in lieu of 0.5 equivalent, of propylene oxide is used.

The metal-containing products of the process are useful as additives for lubricants. As such they impart particularly valuable properties to motor oils and gear lubricants.

The lubricanting oils from which the lubricants of this invention may be prepared may be of synthetic, animal, vegetable, or mineral origin. Ordinarily mineral lubricating oils are preferred by reason of their availability, general excellence, and low cost. For certain applications, oils belonging to one of the other three groups may be preferred. For instance, synthetic polyester oils such as didodecyl adipate and di-2-ethylhexyl sebacate are often preferred as jet engine lubricants. Normally the lubricating oils preferred will be fluid oils, ranging in viscosity from about 40 Saybolt Universal Seconds at 100° F. to about 200 Saybolt Universal Seconds at 210° F.

The effectiveness of the additives of this invention to impart load carrying properties to lubricants is shown by the Timken OK Load Test (ASTM Bulletin No. 181 April 1, 1952). In this test the load is noted at which occurs the rupture of a film of the lubricant between the rotating cup and a stationary block and there occurs noticeable surface distress of the stationary block. Thus the higher the load the better the load carrying properties of the lubricant. The results of the test appear in Table I.

*Table I*

Test lubricant:
Timken OK load test pound-load (dublicate)
A. SAE 90 mineral lubricant containing 0.1% of phosphorus as the product of Example 1 _____ 40, 30
B. SAE 90 mineral lubricant containing 0.1% of phosphorus as the reaction product of zinc dihexylphosphorodithioate with 0.5 equivalent of propylene oxide _____ 25, 23

The corrosion inhibiting properties of the additives of this invention are shown by the results (Table II) of a copper corrosion test. In this test a 15-gram copper strip is immersed in 300 cc. of the test lubricant which is maintained at 300° F. for 72 hours. At the end of the test the weight loss of the copper strip is determined and is taken as a measure of the corrosiveness of the lubricant.

*Table II*

Test lubricant:
Corrosion weight loss of Cu strip (milligrams)
A. SAE 90 mineral lubricant containing 0.1% of phosphorus as the product of Example 1 _ 17.1
B. SAE 90 mineral lubricant containing 0.1% of phosphorus as the reaction product of zinc dihexylphosphorodithioate with 0.5 equivalent of propylene oxide _____ 289

It will be noted that in each of the two tests described above, the additives of this invention are superior to the reaction products of an epoxide with a metal phosphorodithioate. This difference is unexpected inasmuch as the latter have been recognized as effective lubricant additives.

The use of the hereindescribed phosphorous thioic derivatives in lubricants is further illustrated by the following specific examples:

A. SAE 90 gear lubricant _____ 92.0
   Product of Example 1 _____ 8.0
B. SAE 90 gear lubricant _____ 96.0
   Product of Example 2 _____ 4.0
C. SAE 90 gear lubricant _____ 94.0
   Product of Example 3 _____ 6.0
D. SAE 90 gear lubricant _____ 98.0
   Product of Example 4 _____ 2.0
E. SAE 90 gear lubricant _____ 95.0
   Product of Example 6 _____ 5.0
F. SAE 90 gear lubricant _____ 95.3
   Product of Example 7 _____ 4.7
G. SAE 90 gear lubricant _____ 96.6
   Product of Example 8 _____ 3.4
H. SAE 80 gear lubricant _____ 90.0
   Product of Example 9 _____ 10.0
I. SAE 80 gear lubricant _____ 94.5
   Product of Example 11 _____ 5.5
J. SAE 90 gear lubricant _____ 98.0
   Product of Example 11 _____ 2.0
K. SAE 80 gear lubricant _____ 93.5
   Product of Example 12 _____ 6.5
L. SAE 90 gear lubricant _____ 97.5
   Product of Example 12 _____ 2.5

The above gear lubricants may contain, in addition to the above specified additive, other substances which will impart desirable properties to the finished lubricant. Examples of such substances include oxidation inhibitors, extreme pressure agents, rust inhibitors, oiliness agents, etc.

To provide satisfactory protection against the ravages of extreme pressure it is desirable to incorporate into a lubricant at least about 1.0 percent of the metal-containing compositions described previously. Amounts up to 20 percent and even more are also useful. In most cases an optimum concentration is avilable from within the range of 3–10 percent by weight, based on the lubricating composition.

The utility of high concentration; i.e., up to 90 percent or higher, likewise is established by the convenience imparted to the problems and expense of transportation and storage. Such highly concentrated compositions, commonly termed "concentrates" in the trade, may then be diluted with lubricating oil at the destination point so as to provide finished lubricants containing the desired amount of metal-containing compositions of this invention.

The increase in horsepower of automotive engines has placed a corresponding increase of burden on the gear surfaces of axle units. Such a situation has enhanced to a considerable degree the utility of the hereindescribed composition. It has also pointed up the desirability and utility of combinations of various lubricant additives in which the products of this invention are useful. Such combinations as are particularly desirable include specifically the combination of any of the products of the examples herein plus a sulfur-containing organic compound which contains a sulfide linkage. The sulfide linkage contains preferably in addition to the sulfur atom(s) of the linkage, one or more sulfur atoms attached to one of these "linkage" sulfur atoms. Such a compound is illustrated by the structural formula

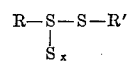

where R and R' are the same or different organic radicals and $x$ is an integer, preferably from 1 to 3.

Specific examples of lubricants which contain the above combination of additives are as follows:

M. Midcontinent SAE 90 oil
   5% of the product of Example 6
   2% of benzyl pentasulfide
N. Midcontinent SAE 90 oil
   4% of the product of Example 7
   1% of butyl tetrasulfide
O. Midcontinent SAE 90 oil
   4% of the product of Example 9
   1.5% of butyl tetrasulfide
P. Midcontinent SAE 80 oil
   6% of the product of Example 12
   3% of chlorobenzyl pentasulfide
Q. Midcontinent SAE 90 oil
   10% of the product of Example 16
   5% of benzyl tetrasulfide
R. Midcontinent SAE 80 oil
   5.5% of the product of Example 5
   2.7% of mixed benzyl tetrasulfide and pentasulfide It will be noted that the combination of ingredients (products of this invention plus polysulfides) may amount to as much as 15% by weight of the lubricant composition. Generally it is also advisable that at least 3-5% of this combination be used in an effective gear lubricant.

A more particular definition of the amounts of ingredients which may be incorporated in the novel gear lubricants may be based on the phosphorus content and the active sulfur content which is imparted to the finished lubricant. Thus the amounts of ingredients should be such that (a) From about 0.20 to about 0.75% by weight phosphorus, and (b) From about 0.25 to about 1.25% by weight of active sulfur are imparted to the lubricant by these two additives.

The term "active sulfur" is intended to denote that portion of sulfur within a molecule which, by virtue of its mode of attachment to other atoms, has a relatively high degree of reactivity. Such sulfur can be characterized in terms of its mode of attachment in that it is thought to be attached only to other sulfur atoms. That is, a sulfur which is attached only to other sulfur atoms is said to be "active sulfur" whereas sulfur atoms which are bound to atoms other than sulfur are not "active sulfur."

Such sulfur atoms may be said to be bonded only by secondary valence bonds.

It should be noted that where a sulfur atom is bound both to another sulfur atom and to an atom other than sulfur, such a sulfur atom is not active.

"Active sulfur" atoms are illustrated by (S) in each of the following structural formulae.

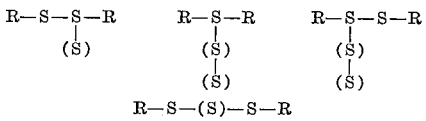

It is apparent that the amount of such a compound which is used in a lubricating composition can be expressed conveniently in terms of the amount of this active sulfur. Furthermore, inasmuch as it is the active sulfur content of these compounds which characterize their performance, such a means of defining the amounts in which they may be used is particularly appropriate.

What is claimed is:

1. A lubricating composition consisting essentially of a mineral lubricating oil and from about 1% to about 20% by weight of the phosphorus- and sulfur-containing material prepared by the process which comprises the reaction of a metal salt of a phosphorus acid having the structure

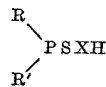

where R and R' are organic radicals having from one to about 30 carbon atoms and are selected from the class consisting of alkyl, cycloalkyl, aryl, aralkyl, alkaryl, alkenyl, and cycloalkenyl radicals, and where X is selected from the class consisting of oxygen and sulfur, with at least about 0.5 equivalent of an organic compound selected from the class consisting of epoxy alkanes, epoxy lower alkenes, epoxy alkyl carboxylic acids, styrene oxide, epichlorohydrin, and thioepoxy lower alkanes, the metal of said metal salt being selected from the class consisting of sodium, lithium, potassium, calcium, barium, strontium, magnesium, aluminum, lead, cadmium, and zinc.

2. A lubricating composition consisting essentially of a mineral lubricating oil and from about 1% to about 20% by weight of a phosphorus- and sulfur-containing material prepared by the process which comprises the reaction of a zinc salt of a phosphorus acid having the structure

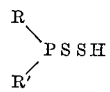

wherein R and R' are alkyl radicals having from one to about 30 carbon atoms with at least about 0.5 equivalent of an epoxy alkane.

3. A lubricating composition consisting essentially of a mineral lubricating oil and from about 1% to about 20% by weight of a phosphorus- and sulfur-containing material prepared by the process which comprises the reaction of a zinc salt of a phosphorus acid having the structure

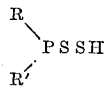

wherein R and R' are alkaryl radicals having from one to about 30 aliphatic carbon atoms with at least about 0.5 equivalent of an epoxy alkane.

4. A lubrication composition consisting essentially of a mineral lubricating oil and from about 1% to about 20% by weight of a phosphorus- and sulfur-containing material prepared by the process which comprises the reaction of the zinc salt of di(isopropylphenyl) phosphinodithioic acid with one equivalent of propylene oxide at a temperature within the range of 0–200° C.

5. A lubrication composition consisting essentially of a mineral lubricating oil and from about 1% to about 20% by weight of a phosphorus- and sulfur-containing material prepared by the process which comprises the reaction of the zinc salt of di(heptylphenyl) phosphinodithioic acid with one equivalent of propylene oxide at a temperature within the range of 0–200° C.

References Cited by the Examiner

UNITED STATES PATENTS

| | | | |
|---|---|---|---|
| 2,346,155 | 4/44 | Denison et al. | 252—32.7 |
| 2,665,294 | 1/54 | Kasolapoff | 252—46.6 |
| 2,797,238 | 6/57 | Miller et al. | 252—46.6 |
| 3,004,996 | 10/61 | Arakelian et al. | 252—46.6 |

FOREIGN PATENTS 539,293    9/41    Great Britain.

DANIEL E. WYMAN, *Primary Examiner*.